United States Patent [19]

Fischer

[11] 3,870,502

[45] Mar. 11, 1975

[54] HERBICIDE

[75] Inventor: Adolf Fischer, Mutterstadt, Germany

[73] Assignee: Badische Anilin- & Soda-Fabrik Aktiengesellschaft, Ludwigshafen, Rhine, Germany

[22] Filed: Apr. 4, 1973

[21] Appl. No.: 348,084

[52] U.S. Cl............................ 71/92, 71/100, 71/111
[51] Int. Cl.............................................. A01n 9/22
[58] Field of Search........................ 71/100, 92, 111

[56] References Cited

UNITED STATES PATENTS

| | | | |
|---|---|---|---|
| 3,546,343 | 12/1970 | Payne, Jr. et al. | 71/100 |
| 3,773,492 | 11/1973 | Fischer | 71/118 |
| 3,787,198 | 1/1974 | Hagimoto et al. | 71/118 |

*Primary Examiner*—James O. Thomas, Jr.
*Attorney, Agent, or Firm*—Johnson, Keil, Thompson & Shurtleff

[57] ABSTRACT

New and valuable herbicide comprising several herbicidal active ingredients.

5 Claims, No Drawings

HERBICIDE

The present invention relates to a herbicide comprising a mixture of a thiol carbamate and a biscarbamate, uracil or pyridazone.

It is known to use thiol carbamates, biscarbamates, uracils and pyridazones for controlling broadleaved and grassy weeds. However, their herbicidal action is poor.

I have now found that a composition of
a. a thiol carbamate of the formula

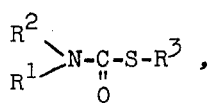

where $R^1$ denotes lower alkyl or alkynyl or a maximum of 4 carbon atoms, $R^2$ denotes cyclohexyl or a bicycloaliphatic or tricycloaliphatic hydrocarbon radical of a maximum of 8 carbon atoms and $R^3$ denotes lower alkyl of a maximum of 4 carbon atoms and
b. a compound of the formula

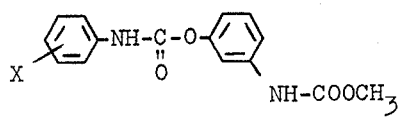

where X denotes methyl, or
c. a compound of the formula

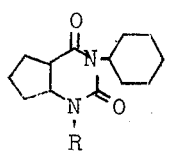

where R denotes hydrogen or the radical

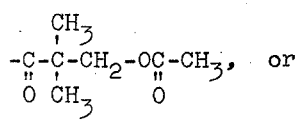

d. a compound of the formula

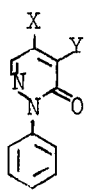

where Y denotes chlorine or bromine and X denotes

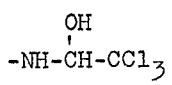

or NH—CO—COO—R, R denoting tert-butyl or isopropyl, has a good herbicidal action.

The active ingredients may be used in any weight ratio, but it is preferred to employ a ratio of a:b, c or d of from 1:5 to 5:1, particularly from 1:3 to 3:1.

The agents according to the invention may be used as herbicides in the form of solutions, emulsions, suspensions, oil dispersions, granules or dusts. The form of application depends entirely on the purpose for which the agents are being used; in any case it should ensure a fine distribution of the active ingredient.

For the preparation of solutions to be sprayed direct, mineral oil fractions of medium to high boiling point, such as kerosene or diesel oil, further coal-tar oils and oils of vegetable or mineral origin, and cyclic hydrocarbons such as tetrahydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, wetting agent, adherent, emulsifying or dispersing agent and possibly solvent. Oils of various types may be added to ready-to-use spray liquors.

Dusts may be prepared by mixing or grinding the active ingredients with a solid carrier, e.g., clay or fertilizers.

Granules may be prepared by bonding the active ingredients to solid carriers.

Directly sprayable dispersions may also be prepared with oils. The new compounds may be mixed with fertilizers, insecticides, fungicides and other herbicides.

EXAMPLE 1

The seeds of beet (Beta vulgaris), wild mustard (Sinapis arvensis), common lambsquarters (Chenopodium album), perennial ryegrass (Lolium perenne), downy brome (Bromus tectorum) and barnyard grass (Echnichloa crus-galli) were sown on an agricultural plot. The soil prepared in this manner was subsequently treated with the following amounts of the following active ingredients and compositions thereof, each active ingredient and each composition being dispersed or emulsified in 500 liters of water per hectare:

I ethyl-N-ethyl-N-bicyclo-[2,2,1]-heptylthiol carbamate, 1.5 and 2 kg/hectare;

II thioethyl N-cyclohexyl-N-propargyl carbamate, 2 and 3 kg/hectare;

III 1- ($\alpha,\alpha$-dimethyl-$\beta$-acetoxypropionyl)-3-cyclohexyl-5,6-trimethylene uracil, 0.5 and 2 kg/hectare;

IV 3-cyclohexyl-5,6-trimethylene uracil, 1 and 3 kg/hectare;

I + III : 1.5 + 0.5 kg/hectare;

II + IV : 2 + 1 kg/hectare.

The following figures show that the compositions have a better herbicidal action than their individual components, combined with the same good crop plant compatibility:

| | I | | II | | III | |
|---|---|---|---|---|---|---|
| | 1.5 | 2 | 2 | 3 | 0.5 | 2 |
| Beta vulgaris | 0 | 0 | 0 | 0 | 0 | 20 |
| Sinapis arvensis | 15 | 20 | 10 | 15 | 55 | 100 |
| Chenopodium album | 25 | 35 | 40 | 15 | 45 | 100 |
| Lolium perenne | 60 | 70 | 55 | 75 | 30 | 95 |
| Bromus tectorum | 45 | 55 | 50 | 70 | 25 | 90 |
| Echinochloa crus-galli | 60 | 75 | 60 | 85 | 30 | 85 |

| | IV | | I + III | II+IV |
|---|---|---|---|---|
| | 1 | 3 | 1.5 + 0.5 | 2+1 |
| Beta vulgaris | 0 | 45 | 0 | 0 |
| Sinapis arvensis | 60 | 100 | 100 | 95 |
| Chenopodium album | 55 | 100 | 100 | 100 |
| Lolium perenne | 35 | 100 | 100 | 100 |
| Bromus tectorum | 35 | 100 | 95 | 100 |
| Echinochloa crus-galli | 35 | 100 | 100 | 100 |

0 = no damage
100 = complete destruction

EXAMPLE 2

In the greenhouse, loamy sandy soil was filled into pots and sown with beet (Beta vulgaris), Indian corn (Zea mays), wild mustard (Sinapis arvensis), common lambsquarters (Chenoopodium album), barnyard grass (Echinochloa crus-galli), perennial ryegrass (Lolium perenne) and downy brome (Bromus tectorum).

The soil was then treated with the following amounts of the following active ingredients and compositions thereof, each active ingredient and each composition being emulsified or dispersed in 500 liters of water per hectare:

I ethyl-N-ethyl-N-bicyclo-[2,2,1]-heptylthiol carbamate, 1.5 and 3 kg/hectare;
II ethyl N-ethyl-N-cyclohexylthiol carbamate, 1.5 and 4 kg/hectare;
III 1-phenyl-4-($\alpha$-hydroxy-$\beta,\beta,\beta$-trichloroethyl)-amino-5-bromopyridazone-(6), 1.5 and 3 kg/hectare;
IV isopropyl N-[1-phenyl-5-bromopyridazon-(6)-yl-(4)]-oxamate, 2.5 and 4 kg/hectare;
I + III : 1.5 + 1.5 kg/hectare;
II + IV : 1.5 + 2.5 kg/hectare.

The results given below show that the compositions have a better overall herbicidal action than their individual components, combined with excellent crop plant compatibility:

| Active ingredient kg/ha | I | | II | | III | |
|---|---|---|---|---|---|---|
| | 1.5 | 3 | 1.5 | 4 | 1.5 | 3 |
| Beta vulgaris | 0 | 5 | 0 | 10 | 0 | .5 |
| Zea mays | 0 | 0 | 0 | 15 | 0 | 20 |
| Sinapis arvensis | 15 | 30 | 10 | 25 | 55 | 100 |
| Chenopodium album | 25 | 45 | 10 | 30 | 60 | 100 |
| Echinochloa crus-galli | 60 | 85 | 60 | 95 | 30 | 75 |
| Lolium perenne | 60 | 90 | 75 | 100 | 30 | 80 |
| Bromus tectorum | 45 | 70 | 40 | 90 | 35 | 70 |

| Active ingredient kg/ha | IV | | I + III | II + IV |
|---|---|---|---|---|
| | 2.5 | 4 | 1.5 + 1.5 | 1.5 + 2.5 |
| Beta vulgaris | 0 | 25 | 0 | 0 |
| Zea mays | 5 | 20 | 0 | 5 |
| Sinapis arvensis | 50 | 85 | 100 | 100 |
| Chenopodium album | 45 | 85 | 100 | 95 |
| Echinochloa crus-galli | 35 | 70 | 100 | 100 |
| Lolium perenne | 30 | 50 | 100 | 100 |
| Bromus tectorum | 30 | 60 | 100 | 95 |

0 = no damage
100 = complete destruction

EXAMPLE 3

In the greenhouse, the plants beet (Beta vulgaris), Indian corn (Zea mays), wild mustard (Sinapis arvensis), common lambsquarters (Chenopodium album), chamomile (Matricaria chamomilla), downy brome (Bromus tectorum) and slender foxtail (Alopecurus myosuroides) were treated at a growth height of 4 to 18 cm with the following amounts of the following active ingredients and compositions thereof, each active ingredient and each composition being emulsified in 500 liters of water per hectare:

I ethyl-N-ethyl-N-bicyclo-[2,2,1]-heptylthiol carbamate, 1.2 and 3 kg/hectare; II 3-methoxycarbonylaminophenyl-N-(3'-methyl-phenyl)-carbamate, 1 and 3 kg/hectare; III 1-($\alpha,\alpha$-dimethyl-$\beta$-acetoxypropionyl)-3-cyclohexyl-5,6-trimethylene uracil, 1 and 2 kg/hectare;
IV 1-phenyl-4-($\alpha$-hydroxy-$\beta,\beta,\beta$-trichloroethylamino)-5-bromopyridazone-(6), 2 and 3 kg/hectare;
I + II : 2 + 1 kg/hectare;
I + III: 1 + 1 kg/hectare;
I + IV : 1 + 2 kg/hectare.

The following results show that the compositions have a better herbicidal action than their individual components, combined with superior crop plant compatibility:

| Active ingredient kg/ha | I | | II | | III | |
|---|---|---|---|---|---|---|
| | 1 | 2 | 3 | 1 | 3 | 1 | 2 |
| Beta vulgaris | 0 | 0 | 10 | 0 | 30 | 0 | 20 |
| Zea mays | 0 | 0 | 0 | 0 | 20 | 0 | 20 |
| Sinapis arvensis | 5 | 10 | 20 | 85 | 100 | 75 | 100 |
| Chenopodium album | 5 | 10 | 20 | 85 | 100 | 70 | 100 |
| Matricaria chamomilla | 10 | 20 | 35 | 40 | 95 | 70 | 100 |
| Bromus tectorum | 30 | 65 | 85 | 5 | 10 | 30 | 70 |
| Alopecurus myosuroides | 30 | 65 | 90 | 10 | 20 | 35 | 90 |

| Active ingredient kg/ha | IV | | I+II | I+III | I+IV |
|---|---|---|---|---|---|
| | 2 | 3 | 2+1 | 1+1 | 1+2 |
| Beta vulgaris | 0 | 20 | 0 | 0 | 0 |
| Zea mays | 5 | 20 | 0 | 0 | 5 |
| Sinapis arvensis | 70 | 100 | 100 | 95 | 95 |
| Chenopodium album | 75 | 100 | 100 | 95 | 100 |
| Matricaria chamomilla | 70 | 100 | 100 | 95 | 95 |
| Bromus tectorum | 40 | 70 | 95 | 90 | 95 |
| Alopecurus myosuroides | 40 | 70 | 95 | 90 | 95 |

0 = no damage
100 = complete destruction

The action of the following compositions corresponds to that of those described in Example 1:
- thioethyl N-bicyclo-(3,3,0)-octyl-N-propyn-(2)-yl-(1)-carbamate + 1-(α,α,-dimethyl-β-acetoxypropionyl)-3-cyclohexyl-5,6-trimethylene uracil
- ethyl-N-ethyl-N-bicyclo-[2,2,1]-hepthylthiol carbamate + 3-cyclohexyl-5,6-trimethyl uracil
- thioethyl N-bicyclo-(3,3,0)-octyl-N-propyn-(2)-yl-(1)-carbamate + 1-(α,α-dimethyl-β-acetoxypropionyl)-3-cyclohexyl-5,6-trimethylene uracil
- ethyl-N-ethyl-N-bicyclo-[2,2,1]-hepthylthiol carbamate + 1-(α,α-dimethyl-β-acetoxypropionyl)-3-cyclohexyl-5,6-trimethylene uracil N-1- or 2-bicyclo-(3,3,0)-octyl-N-ethylethylthiol carbamate + 1-(α,α-dimethyl-β-acetoxypropionyl)-3-cyclohexyl-5,6-trimethylene uracil
- N-1- or 2-bicyclo-(3,3,0)-octyl-N-ethylethylthiol carbamate + 3-cyclohexyl-5,6-trimethylene uracil
- methyl N-1- or 2-bicyclo-(3,3,0)-octyl-N-ethylthiocarbamate + 1-(α,α-dimethyl-β-acetoxypropionyl)-3-cyclohexyl-5,6-trimethyleneuracil.

The action of the following compositions corresponds to that of those described in Example 2:
- ethyl-N-ethyl-N-bicyclo-[2,2,1]-heptylthiol carbamate + tert-butyl N-[1-phenyl-5-bromopyridazon-(6)-yl-(4)]-oxamate, ethyl N-1- or 2-bicyclo-(3,3,0)-octyl-N-ethylthiocarbamate, 1-phenyl-4-(α-hydroxy-β,β,β-trichloroethyl)-amino-5-bromopyridazone-(6), ethyl N-1- or 2-bicyclo-(3,3,0)-octyl-N-ethylthiocarbamate, isopropyl N-[1-phenyl-5-bromopyridazon-(6)-yl-(4)]-oxamate, ethyl-N-ethyl-N-bicyclo-[2,2,1]-heptylthiol carbamate + 1-phenyl-4-(α-hydroxy-β,β,β-trichloroethylamino-5-chloropyridazone-(6)
- thioethyl N-[1- or 2-(3a,4,5,6,7,7a-hexahydro-4,7-methanoindanyl)]-N-ethylcarbamate + 1-phenyl-4-(α-hydroxy-β,β,β-trichloroethyl)-amino-5-bromopyridazone-(6)
- ethyl N-1- or 2-bicyclo-(3,3,0)-octyl-N-ethylthiocarbamate + 1-phenyl-4-(α-hydroxy-β,β,β-trichloroethyl)-amino-5-bromopyridazone-(6), thioethyl N-bicyclooctyl-(3,2,1)-N-propyn-(2)-yl-(1)carbamate, 1-phenyl-4-(α-hydroxy-β,β,β-trichloroethyl)-amino-5-bromopyridazone-(6).

I ethyl N-ethyl-N-cyclohexylthiol carbamate, 1.5, 1.75 and 2 kg/hectare;
II 1-(α,α-dimethyl-β-acetoxypropionyl)-3-cyclohexyl-5,6-trimethylene uracil, 0.5 and 1.75 kg/hectare;
III 3-cyclohexyl-5,6-trimethylene uracil, 0.5 and 2 kg/hectare;
I + II : 1.5 +0.25 kg/hectare;
I + III; 1.5 + 0.5 kg/hectare.

After 3 to 4 weeks it was ascertained that the compositions had a better herbicidal action than their individual components, combined with the same good crop plant compatibility.

The results are given below:

| Active ingredient kg/ha | I | | | II | | III | | I + II | I + III |
|---|---|---|---|---|---|---|---|---|---|
| | 1.5 | 1.75 | 2 | 0.5 | 1.75 | 0.5 | 2 | 1.5 + 0.25 | 1.5 + 0.5 |
| Beta vulgaris | 0 | 0 | 0 | 0 | 15 | 0 | 30 | 0 | 0 |
| Bromus tectorum | 40 | 50 | 55 | 25 | 70 | 25 | 75 | 85 | 95 |
| Chenopodium album | 10 | 20 | 25 | 45 | 80 | 35 | 65 | 85 | 85 |
| Echinochloa crus-galli | 60 | 65 | 65 | 30 | 65 | 25 | 75 | 100 | 100 |
| Sinapis arvensis | 10 | 15 | 20 | 55 | 80 | 40 | 70 | 85 | 90 |

0 = no damage
100 = complete destruction

EXAMPLE 4

In the greenhouse, loamy sandy soil was filled into pots and sown with seeds of the plants listed below. The soil was then treated with the following amounts of the following active ingredients and compositions thereof, each active ingredient and each composition being emulsified in 500 liters of water per hectare:

I claim:
1. A selective herbicide composition containing a herbicidally effective amount of
a. a thiol carbamate of the formula

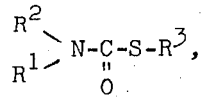

wherein $R^1$ denotes lower alkyl or alkynyl of a maximum of 4 carbon atoms, $R^2$ denotes cyclohexyl or a bicycloaliphatic or tricycloaliphatic hydrocarbon radical of a maximum of 8 carbon atoms and $R^3$ denotes lower alkyl of a maximum of 4 carbon atoms and
b. a compound of the formula

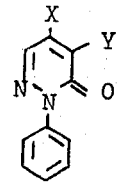

where Y denotes chlorine or bromine and X denotes

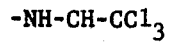

or NH—CO—COO—R, R denoting tert-butyl or isopropyl, in a weight ratio of a to b in the range of 1:5 to 5:1.

2. A selective herbicide composition as claimed in claim 1 wherein said weight ratio is 1:3 to 3:1.

3. A selective herbicide composition as claimed in claim 1 wherein compound a is a member selected from the group consisting of ethyl-N-ethyl-N-bicyclo[2,2,1]-heptylthiol carbamate, thioethyl N-cyclohexyl-N-propargyl carbamate, ethyl N-ethyl-N-cyclohexylthiol carbamate, 3-methoxycarbonylaminophenyl-N-thioethyl N-bicyclo-(3,3,0)-octyl-N-propyn-(2)-yl-(1)carbamate, N-1- or 2-bicyclo- (3,3,0)-octyl-N-ethylethylthiol carbamate, methyl N-1- or 2-bicyclo-(3,3,0)-octyl-N-ethylthiocarbamate, ethyl N-1- or 2-bicyclo-(3,3,0)-octyl-N-ethylthiocarbamate, thioethyl N-[1- or 2-(3a,4,5,6,7,7a-hexahydro-4,7-methanoindanyl)]-N-ethylcarbamate, ethyl N-1- or 2-bicyclo-(3,3,0)-octyl-N-methylthiocarbamate, and thioethyl N-bicyclooctyl-(3,2,1)-N-propyn-(2)-yl-(1)-carbamate.

4. A selective herbicide composition as claimed in claim 2 wherein compound b is selected from the group consisting of 1-phenyl-4-($\alpha$-hydroxy-$\beta$,$\beta$,$\beta$-trichloroethyl)-amino-5-bromopyridazone-(6), isopropyl N-[1-phenyl-5-bromopyridazon-(6)-yl-(4)]-oxamate, tert-butyl N-[1-phenyl-5-bromopyridazon-(6)-yl-(4)]-oxamate, and 1-phenyl-4-($\alpha$-hydroxy-$\beta$,$\beta$,$\beta$-trichloroethyl)-amino-5-chloropyridazone-(6).

5. A selective herbicide composition as claimed in claim 1 wherein compound $a$ is ethyl N-ethyl-N-cyclohexylthiol carbamate, and compound $b$ is isopropyl N-[1-phenyl-5-bromopyridazon-(6)-yl-(4)]-oxamate.

* * * * *

UNITED STATES PATENT AND TRADEMARK OFFICE
CERTIFICATE OF CORRECTION

PATENT NO. : 3,870,502
DATED : March 11, 1975
INVENTOR(S) : Adolf Fischer

It is certified that error appears in the above-identified patent and that said Letters Patent are hereby corrected as shown below:

In the Heading, insert --[30] Foreign Application Priority Data  April 15, 1972  Germany  P 22 18 347.7--

In Column 5, Line 8, delete " -5,6-trimethyl uracil" and substitute --  -5,6-trimethylene uracil --

In Column 6, Lines 6 & 7 of Claim 3, delete "cyclohexylthiol carbamate, 3-methoxycarbonylaminophenyl-N-thioethyl N-bicyclo" and substitute --cyclohexylthiol carbamate, thioethyl N-bicyclo-(3,3,0)-octyl-N-propyn-(2)-yl-(1)-carbamate--

Signed and Sealed this

Seventeenth Day of August 1976

[SEAL]

Attest:

RUTH C. MASON
Attesting Officer

C. MARSHALL DANN
Commissioner of Patents and Trademarks